Figure 1:
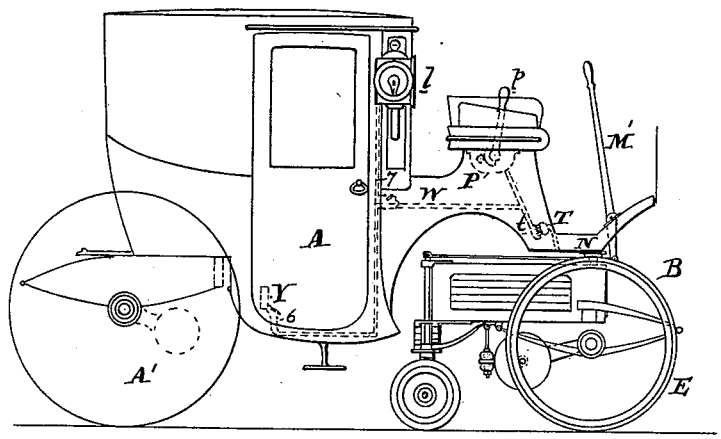

No. 625,953. Patented May 30, 1899.
R. M. HUNTER.
ELECTRIC DEVICE FOR PROPELLING AND CONTROLLING VEHICLES.
(Application filed Mar. 29, 1899.)
(No Model.)

Attest
R. M. Kelly
H. Powell

Inventor
R. M. Hunter

THE NORRIS PETERS CO., PHOTO-LITHO., WASHINGTON, D. C.

UNITED STATES PATENT OFFICE.

RUDOLPH M. HUNTER, OF PHILADELPHIA, PENNSYLVANIA.

ELECTRIC DEVICE FOR PROPELLING AND CONTROLLING VEHICLES.

SPECIFICATION forming part of Letters Patent No. 625,953, dated May 30, 1899.

Application filed March 29, 1899. Serial No. 710,875. (No model.)

*To all whom it may concern:*

Be it known that I, RUDOLPH M. HUNTER, of the city and county of Philadelphia, State of Pennsylvania, have invented an Improvement in Electric Devices for Propelling and Controlling Vehicles, of which the following is a specification.

My invention has reference to electric devices for propelling and controlling vehicles; and it consists of certain improvements fully set forth in the following specification and shown in the accompanying drawings, which form a part thereof.

This application (Case No. 309) has special reference to an electric motive means adapted for ready attachment to vehicles already in use, whereby a brougham, phaeton, or wagon may be electrically propelled without material modification or change in the said vehicles. Generally speaking, the front wheels and axles are removed and my improved electromotive mechanism substituted, the latter being attached to the vehicle-body by a king-bolt or universal pivot-joint.

More specifically considered, my invention comprehends a battery compartment or box for housing the electrical accumulators, said box being spring-supported upon a pair of driving-wheels and one or more steering-wheels. The electric motors are geared or otherwise connected to the driving-wheels by power-transmitting connections. I prefer to employ two electric motors, one to each of the driving-wheels and operating independently. A suitable series-multiple controller or other means for regulating the speed of the motors is attached to the vehicle proper or adapted to be operated therefrom and is electrically connected with the batteries and motors, so as to permit of their movement about the king-bolt or universal joint, by which they are indirectly connected with the vehicle-body. The accumulator-cells are preferably arranged in series connection and the motors and their field-coils thrown in series or parallel to vary the amperes of current, and hence the speed. In steering where sharp turns are required, as in turning out from a curb or rounding a corner, or where a quick turn is necessary to avoid a collision, it is advisable to throw the entire motive force upon the "off" wheel, or that one away from the direction of turning, and this action is combined with the movement of the steering wheel or wheels to cause the entire propelling mechanism to quickly turn upon the king-bolt while moving forward. To secure this result, I provide a suitable electric switch device which under the extreme movements of the steering-lever cuts out one or the other of the two motors or so controls the motive power as to confine the propelling action wholly to one side of the vehicle. The rear wheels and body need perform no function in the propelling or steering, and hence are simply dragged or pulled along, and being supported only on two wheels offer no material resistance to the proper swinging of the forward part under the action of the electromotive mechanism applied thereto at the king-bolt. The electric switches are preferably so arranged as to cut out or shunt the armatures of the motors, but do not come into action in ordinary steering when normally running, as that action is accomplished by the steering-wheels alone. When either of the armatures are cut out, the motor-circuits may have resistances temporarily inserted by the switches to keep down the current supplied to the remaining motor in circuit and prevent too-rapid speed when making the sharp turns.

Broadly considered, my invention is an electric motive mechanism self-contained and capable of independent steering and so combined with a vehicle-body of any usual construction that the latter is propelled and steered under the will of the operator. It is further evident that in a single "stable" it is possible to have one electromotive mechanism for a variety of vehicle-bodies, so that a gentleman may have his electric brougham, phaeton, drag, &c., at a moderate cost, especially so as he can readily adapt his present horse-vehicles to use with my invention.

My improvements will be better understood by reference to the accompanying drawings, in which—

Figure 2:
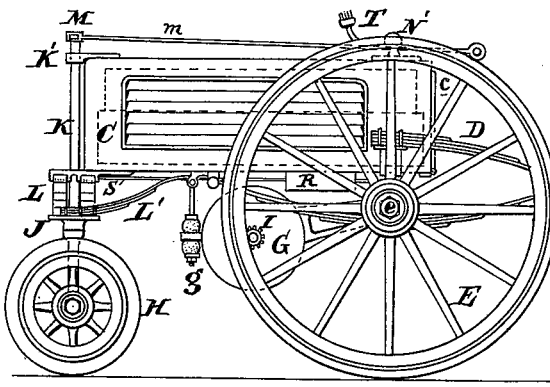
Figure 4:
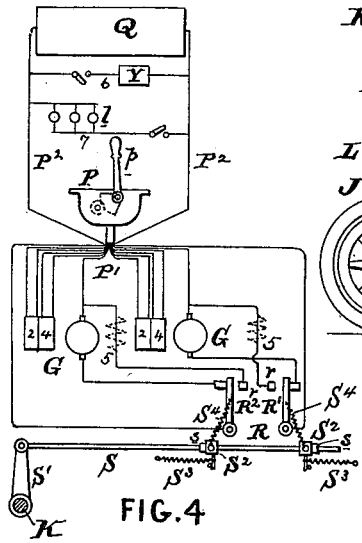
Figure 3:
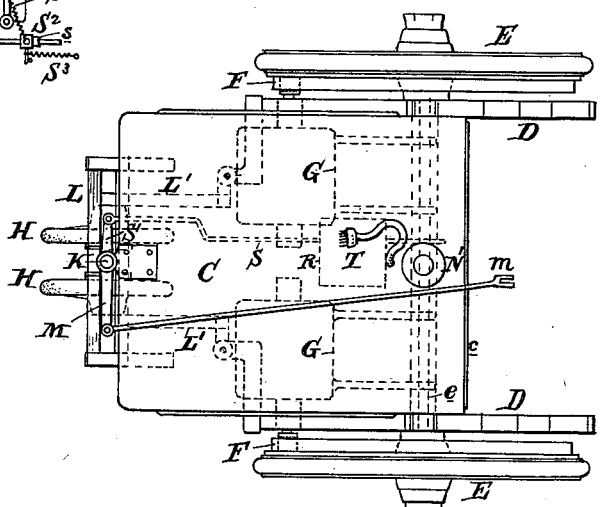
Figure 5:
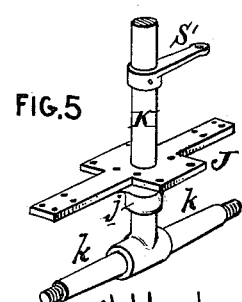
Figure 6:

Figure 1 is a side elevation of an electric brougham embodying my invention. Fig. 2 is an enlarged view of the electromotive mechanism of same. Fig. 3 is a plan view of same. Fig. 4 is a diagram of the electric circuits and controlling devices. Fig. 5 is a perspective view of a portion of the steering mechanism, and Fig. 6 is a sectional elevation of the king-bolt or universal joint between the vehicle-body and the electromotive mechanism.

A is the vehicle-body and, as shown, is that of an ordinary brougham. It may be the body and rear wheels of any style of carriage or wagon now in use. The body is supported at the rear on the usual springs and wheels A' and at the front by the electromotive mechanism B through a universal joint or king-bolt connection N. It will be observed that the ordinary front wheels and springs are removed, as is also the usual "fifth-wheel," and the space occupied by them taken up by the electric motive mechanism B. It is evident, however, that in cases where the vehicle-body is high from the ground the upper half of the fifth-wheel now in use may rest upon the top of the battery-box C, if so desired.

The battery box or compartment C is closed on all sides but the front, and this is provided with a door c, through which the batteries Q may be inserted or removed. This box C is supported at the front upon an axle e by springs D. The driving-wheels E are journaled upon each end of the axle and have their fellies or rims provided with internal gears F. The electric motors G G are hinged to or supported by the axle e and are provided on their armature-shafts with pinions I, meshing with the gears F. By making the gears F of approximately the internal diameter of the felly the lightness in appearance of the wheels is maintained. I would also point out that as the driving-wheels are smaller than usually employed in motor-vehicles and the application of power is near the rim the motors may be smaller and with two pole-fields, since their speed of revolution would be higher. The free ends of the motors G are suspended in any suitable manner. As shown, they are supported by a long bolt from the battery-box C, as at g, and the jarring is taken up by the rubber springs shown, between which the motor-bracket is supported.

H H are two small rubber-faced steering-wheels, journaled on bearings k on each side of an upright rod or shaft K, having capacity for rotation about a vertical or upright axis. The upper end of this shaft K extends through a bearing K' on the box and has a crank-arm M, by which it may be turned. The lower portion of the shaft K is provided with a shoulder-bearing j, upon which a plate J rests and is journaled, Fig. 5. L are transverse springs connecting the plate J with the battery-box C, and L' are longitudinal springs also connecting the plate J with the battery-box. By these springs L L' the plate J, acting as a lower bearing for the shaft K, is made to float and at the same time transmit part of the weight of the batteries to the steering-wheels. While I have shown the battery-box largely located between the wheels E and H, it is evident that more of the weight may be made to come upon the driving-wheels, if so preferred, by simply shifting the box forward or placing the motors upon the opposite side of the axle e. I prefer to use two small steering-wheels H H because the steering action is better and the wheels may be made lighter; but it is apparent that a single wheel would answer the purpose, and hence I do not confine myself to any particular type of steering-wheels or mode of moving them.

The forward end of the battery-box C is connected at N with the vehicle-body A by a pivot-joint, preferably with capacity for universal movement. As shown, this joint is made by a ball-head N' on the box C, fitting into a socket $N^2$ on the under side of the vehicle. It may be clamped in place by a removable plate $N^3$ and bolt n. (Shown in Fig. 6.) Any other suitable pivot may be employed if desired.

The vehicle-body A is provided with an operator's seat, under which may be placed the controller P for the motors, and this is adapted to be operated by a handle p. The circuits from the controller terminate in a contact-block t, near the platform and pivot N. The circuits from the motors and battery are brought up through the battery-box C, near the pivot N, by a flexible cable, and this cable terminates in a contact block or head T, adapted for making connection with terminal block t. In this manner the motor mechanism is quickly connected electrically with the controller and permits of free movement for steering. While it is apparent that the controller P might be attached to the box C and operated by a rod from the operator's seat, experience has convinced me that it is the better practice to have the actual controller mechanism so located that it cannot be affected by any movements, such as in steering. It is under more positive control when located under the operator's seat.

M' is the steering-lever and extends up through the platform of the vehicle, to which it is pivoted, and connects at its bottom with the lever M by a rod m. The connection between m and M' is detachable to permit ready disconnection. By moving the lever M' the steering-wheels H will be turned to the proper angle, and if the controller-handle p be then moved the mechanism B as a whole will move on a curve.

The shaft K of the steering-gear has an arm S', which operates a rod S, having collars s s on it. $S^2 S^2$ are two sliding blocks, also preferably sleeved on the rod and held normally in place by springs $S^3$. These blocks $S^2$ are connected by springs $S^4$ with the switch-levers R' and $R^2$, respectively, as shown in Fig. 4. These switches control the current in the two motors G G. As shown in Fig. 4, the switches are closed to permit the current flowing through the armatures of both motors when the controller P is operated. Now on ordinary steering with the controller P "on" the slight shifting of the rod S will not move either block $S^2$ across the pivot-points of the switch-levers R' $R^2$; but if a very quick turn is required, either with the controller on or off, the rod S will be shifted to such an extent that one of the collars s will move one of the blocks S² beyond the pivot of the switch-lever, and it will snap open and then close upon a contact r of a circuit 5 around the armature. This circuit 5 may contain, if desired, a resistance, as indicated in dotted lines. It is of course to be understood that only one of the switches R' R² can operate at any one time, and this always in connection with the motor on the side toward which the turn is to be made. By closing the shunt r on the side the motor is to be rendered non-propelling before the armature-circuit is broken excessive sparking will be avoided, and if the armature is simply maintained in shunted relation it then acts as a dynamo or electric brake to retard the action of the wheel; but this would only be useful when running at considerable speed. When the action is taking place upon one of the switches R' R², the other remains closed, and the rod S simply moves through the block S². If the springs S⁴ are of sufficient elasticity, the blocks S² might be secured to the rod S, in which case the additional springs S³ would be dispensed with. I do not confine myself to any particular construction of switch mechanism R, as it may be made in various ways, the only requirement being that it shall destroy or reduce the propelling action of the motor on the side to which the vehicle is to move. It is also evident that this switch mechanism R might be operated by hand in place of being controlled by the steering means; but for obvious reasons I prefer to employ it as an adjunct of the steering means, as set out.

The electric lights l of the vehicle may be energized by the current from the battery through circuits 7, fixed on the vehicle, and likewise the electric heater Y may be energized and controlled from circuits 6.

The controller P may be of any suitable construction and is supplied with current from the batteries Q by circuits P² and delivers it to the motors G G by circuits P'. The motors may have one or two sets of field-coils, 2 and 4 representing two sets of field-coils, which may be thrown in series or parallel in addition to throwing the motors as a whole in series or parallel for varying the speed. In some cases a single motor may be employed with my invention, in which case the controller would be differently constructed in detail, and what is known as a "jack-in-the-box" employed in the driving mechanism; but I prefer to employ two independent motors under most conditions.

It will be evident that while the driving-wheels E are preferably in advance of the steering-wheels H it is not necessary that they should be so arranged, and this condition may be changed by simply turning the electromotive mechanism B around on its pivot N. It is also to be understood that while I prefer the manner of pivoting the steering-wheels here shown they may nevertheless be made adjustable by employing the more expensive well-known knuckle-joints for their bearings. In this latter case the steering-wheels H H could be placed farther apart without putting excessive strain upon the operator, since the leverage remains the same.

When it is desired to have the batteries charged, the body A may be disconnected and a temporary seat and controller clamped upon the box C by which the operator may run the electromotor mechanism B down to the charging-station without necessity of taking the whole vehicle. This is most advantageous in private and general livery stables.

Motors may be arranged to drive the rear wheels A' of the body, if desired, in place of or in conjunction with the motors G. My invention is also applicable to cases where other motive power—such as oil, air, or vapor—is applied as the propelling power.

I do not confine myself to the minor details, as these may be modified without departing from the spirit of the invention.

Having now described my invention, what I claim as new, and desire to secure by Letters Patent, is—

1. In an electrically-propelled vehicle the combination of the body portion having a pair of rear wheels, with an electromotive mechanism consisting of a battery-box spring-supported on a pair of driving-wheels and pivoted to the front of the vehicle-body portion, a battery in and movable with the box, a separate electric motor for rotating each of the driving-wheels, electric circuits for supplying current from the battery to the motors, and means extending to the vehicle-body for rendering either motor non-propelling whereby the battery-box motors and driving-wheels may be caused to travel in a curve.

2. In an electrically-propelled vehicle the combination of the body portion having a pair of rear wheels, with an electric motive mechanism consisting of a battery-box spring-supported on a pair of driving-wheels and pivoted to the front of the vehicle-body portion, a battery in and movable with the box, a separate electric motor for rotating each of the driving-wheels, electric circuits for supplying current from the battery to the motors, a controller for simultaneously controlling the speed of the motors adapted to be operated from the vehicle-body, and means also extending to the vehicle-body for rendering either motor non-propelling whereby the battery-box motors and driving-wheels may be caused to travel in a curve.

3. In an electrically-propelled vehicle the combination of the body portion having a pair of rear wheels, with an electromotive mechanism consisting of a battery-box spring-supported on a pair of driving-wheels and pivoted to the front of the vehicle-body portion, a battery in and movable with the box, a separate electric motor for rotating each of the driving-wheels, electric circuits for supplying current from the battery to the motors, a controller for simultaneously controlling the speed of both motors adapted to be operated from the vehicle-body, one or more steering-wheels also supporting the battery-box and independently of the vehicle-body, and means also extending to the vehicle-body for adjusting the steering-wheels and rendering either motor non-propelling whereby the battery-box motors and driving-wheels may be caused to travel in a curve.

4. An electric motive mechanism for vehicles consisting of a battery-box having a pivot connection for attachment to a vehicle-body, springs and axles for sustaining the battery-box, a pair of driving-wheels, two electric motors for respectively rotating said wheels, one or more steering-wheels also supporting the battery-box, means for adjusting the angle of the steering-wheels, and a battery in the box for supplying current to the motors.

5. An electric motive mechanism for vehicles consisting of a battery-box having a pivot connection for attachment to a vehicle-body, springs and axles for sustaining the battery-box, a pair of driving-wheels, two electric motors for respectively rotating said wheels, one or more steering-wheels also supporting the battery-box, means for adjusting the angles of the steering-wheels, a battery in the box for supplying current to the motors, and electric switches for rendering either motor non-propelling.

6. An electric motive mechanism for vehicles consisting of a battery-box having a pivot connection for attachment to a vehicle-body, springs and axles for sustaining the battery-box, a pair of drawing-wheels, two electric motors for respectively rotating said wheels, one or more steering-wheels also supporting the battery-box, means for adjusting the angle of the steering-wheels, a battery in the box for supplying current to the motors, and electric switches for rendering either motor non-propelling, and connecting devices between said switches and steering means whereby the motor for the wheel on the side toward the direction in which the vehicle is to run is automatically rendered non-propelling when the steering wheel or wheels are turned.

7. An electrically-propelled vehicle having a battery supported on driving and steering wheels, combined with a separate electric motor to rotate each of the driving-wheels, means for adjusting the steering-wheels, and switch devices under the control of the steering means for rendering either of the motors non-propelling.

8. An electrically-propelled vehicle having a battery supported on driving and steering wheels, combined with a separate electric motor to rotate each of the driving-wheels, means for adjusting the steering-wheels, switch devices under the control of the steering means for rendering either of the motors non-propelling, a trailing body part pivoted to the driving-wheels adapted to swing laterally, and means on the body part for controlling the current to both motors and operating the steering means.

9. In an electrically-propelled vehicle self-propelled battery and motor mechanism, combined with a body part supported upon a pair of wheels at one end and pivoted at the other end to the self-propelled battery and motor mechanism on a vertical axis.

10. In an electrically-propelled vehicle self-propelled battery and motor mechanism provided with an adjustable steering wheel or wheels, combined with a body part supported upon a pair of wheels at one end and pivoted at the other end to the self-propelled battery and motor mechanism on a vertical axis and independent of the steering-wheels.

11. In an electrically-propelled vehicle a frame having a pair of driving-wheels, electric-motor mechanism to rotate said wheels and an adjustable steering-wheel, combined with a trailing body part supported upon rear wheels, and a pivot connection between the forward part of the body and the frame carrying the driving and steering wheels.

12. In an electrically-propelled vehicle a frame having a pair of driving-wheels, electric-motor mechanism to rotate said wheels and an adjustable steering-wheel, combined with a trailing body part supported upon rear wheels, a pivot connection between the forward part of the body and the frame carrying the driving and steering wheels, and means for controlling the electric motors and adjusting the steering-wheels from the trailing body part.

13. In an electrically-propelled vehicle a pivoted truck portion provided with a battery-compartment and one or more adjustable steering-wheels, a battery in said compartment and movable with the truck independently of the body, a body part supported on two wheels at its rear and pivoted at its forward part upon the truck portion, and means on the body part for controlling the steering-wheels and flow of current from the battery of the truck.

14. An electrically-propelled truck having one or more adjustable steering-wheels, combined with a trailing vehicle-body, a detachable universal-pivot connection between the forward part of the body and truck whereby they may be detached when required but are normally inseparable, and detachable means extending to the vehicle-body for controlling the steering-gear.

15. The combination of the battery-box C, the driving-wheels E supporting the box by springs, two electric motors G separately arranged to rotate the two driving-wheels, one or more steering-wheels having a support rotatable on a vertical axis and spring-connected with the battery-box, a battery in the box, and a trailing body A supported at the rear on two wheels and pivotally connected at the front with the battery-box.

16. The combination of a battery-box C, the driving-wheels E supporting the box by springs, two electric motors G separately arranged to rotate the two driving-wheels, one or more steering-wheels having a support rotatable on a vertical axis and spring-connected with the battery-box, a battery in the box, a trailing body A supported at the rear on two wheels and pivotally connected at the front with the battery-box, a controller P for regulating the motors carried on the body A, flexible circuits connecting the controller with the battery and motors, and means for operating the steering wheel or wheels from the body.

17. The combination of the battery-box C, the driving-wheels E supporting the box by springs, two electric motors G separately arranged to rotate the two driving-wheels, one or more steering-wheels having a support rotatable on a vertical axis and spring-connected with the battery-box, a battery in the box, a trailing body A supported at the rear on two wheels and pivotally connected at the front with the battery-box, and means for operating the steering wheel or wheels extending to the body.

18. In an electrically-propelled vehicle, a frame having two driving-wheels independently rotated, a rear steering-wheel of smaller diameter adjustable upon the frame about an upright axis, a separate electric motor to rotate each of the driving-wheels sustained by the frame, a trailing body part supported upon wheels and pivoted at its forward part to the frame of the driving wheels and motors, and means extending to the body part for controlling the motors and operating the steering-wheel.

19. In a motor-vehicle, the combination of a pivoted mechanically-driven truck having driving-wheels and one or more steering-wheels adjustable about an upright axis, and a trailing body portion supported upon wheels at the rear and having its forward end pivoted to the truck.

20. In a motor-vehicle, the combination of a pivoted mechanically-driven truck having driving-wheels and one or more steering-wheels adjustable about an upright axis, a trailing body portion supported upon wheels at the rear and having its forward end pivoted to the truck, and means extending from the body portion to the pivoted truck for adjusting the steering-wheel and controlling the speed of the driving means.

21. In an electrically-propelled vehicle, self-propelled battery and motor mechanism, combined with a body part supported upon a pair of wheels at one end and pivoted at the other end to the self-propelled battery and motor mechanism on a vertical axis, a controller for regulating the speed of the motors arranged upon the body part, flexible circuits connecting the controller with the battery and motor mechanism, and a detachable electric coupling in said circuits to permit quick connection and disconnection of the motor mechanism with the body part.

In testimony of which invention I have hereunto set my hand.

R. M. HUNTER.

Witnesses:
   J. W. KENWORTHY,
   R. M. KELLY.